United States Patent Office 3,647,729
Patented Mar. 7, 1972

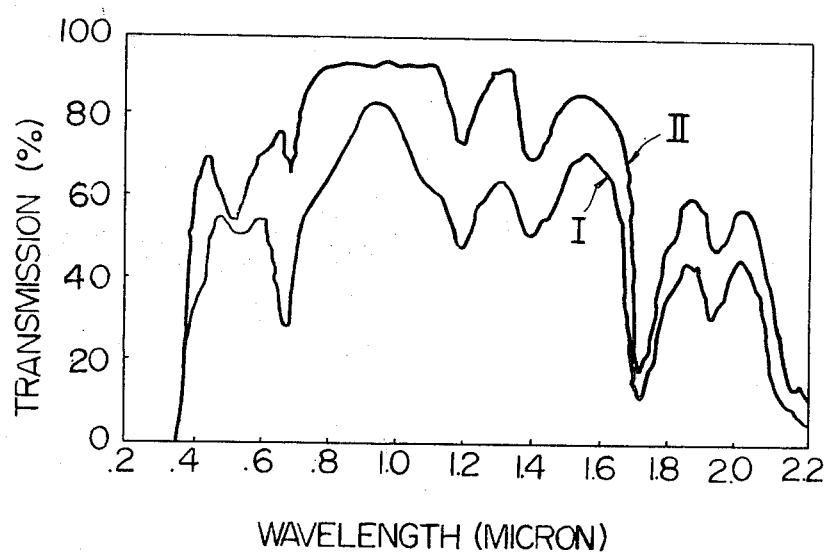

3,647,729
INFRARED-ABSORBENT METHYL METHACRYLATE RESIN COMPOSITION AND SHAPED ARTICLES THEREOF
Haruo Nagai and Naohisa Sugiyama, Niigata-ken, Japan, assignors to Kyowa Gas Chemical Industry Co., Ltd., Tokyo, Japan
Filed Apr. 29, 1969, Ser. No. 820,064
Claims priority, application Japan, Apr. 10, 1967, 42/22,466, 42/51,264
Int. Cl. C08f 45/62
U.S. Cl. 260—23 AR      20 Claims

ABSTRACT OF THE DISCLOSURE

A thermic ray-absorbent methyl methacrylate resin composition comprising a methyl methacrylate resin which may contain not over 50% by weight of a copolymerizable monomer, said resin being incorporated with a nickel compound selected from the group consisting of organic acid salts of nickel and nickel complexes, in an amount of 0.07–5% by weight, calculated as nickel and shaped articles made therefrom.

---

This invention relates to a stable infrared-absorbent methyl methacrylate resin composition and shaped articles made therefrom, wherein the composition, without sacrificing its heat resistance and weatherability, is able to check and absorb the thermic rays (infrared rays) from the sun and other light sources satisfactorily but has good see-through property since it transmits as much as possible of the visible light of the visible region while it absorbs the radiant energy to an extent necessary for achieving glare prevention, thereby demonstrating excellent performance for such uses as window glare of automobile and buildings, protective filters for use in equipment using intense light sources, such as projectors and in televisions, as well as protective goggles and other similar uses.

More specifically, the invention relates to a thermic ray-absorbent methyl methacrylate resin composition and shaped articles made therefrom, wherein said resin being a methyl methacrylate resin which may contain not over 50% by weight of a copolymerizable monomer is incorporated with a nickel compound selected from the group consisting of organic acid salt of nickel and nickel complexes, in an amount, calculated as nickel, of 0.07–5% by weight, preferably 0.1–2% by weight, and still more preferably 0.3–1.5% by weight.

For example, the spectrum of the radiant energy of sun demonstrates a hill-shaped distribution extending over a wavelength range from 0.3 micron to about 2.1 microns with the apex at about 0.55 micron. Of this radiant energy, that accounted for by the infrared region corresponds to about 55% of the total solar radiant energy.

Hence, for the effective absorption of the solar radiant energy, it is desired to absorb as much as possible of the radiant energy of the infrared region and moreover to absorb the radiant energy of the visible region to an extent necessary to achieve glare prevention while permitting the transmission of visible light to an extent sufficient to cause no hindrance to the purpose for which the article is intended.

The methyl methacrylate resin absorbs the wave-lengths of 2.2 microns or longer, but since the radiant energy of the wavelength region of such as the aforementioned solar radiant energy is transmitted relatively well, it cannot satisfactorily prevent the transmission of the thermic rays from the sun and other light sources.

On the other hand, as infrared or heat-absorbent glass, there is known the phosphate or borophosphate glass in which has been incorporated a small quantity, usually of the order of 1–3% of FeO, or the common glass which has similarly been incorporated with FeO. However, it is not known at all as to whether this knowledge concerning the infrared-absorbent glass could be applied to resins. In fact, since an inorganic compound such as FeO cannot be incorporated uniformly dispersed in the methyl methacrylate resin, it cannot be utilized.

As regards the control of light transmission of resins, the methacrylate resin colored with the usual oil-soluble dyestuffs is known. However, the absorption demonstrated in this case is that due to the characteristics of the dyestuff used and is limited to only the visible region, the absorption in the infrared region being practically the same as that of the uncolored, transparent methacrylate resin. As a result, the transmission of visible light is low and the see-through property thus suffers, and moreover the thermic ray absorption effect is exceedingly small. Hence, no substantial improvement in the thermic ray absorption effect can be hoped for even though it is used in an amount exceeding that which results in the maximum permissible hindrance to the see-through property.

It has been recently disclosed that very special derivatives of N,N,N′,N′-tetrakis(p-substituted phenyl)-p-phenylene diamines or benzidines containing such as As, Sb and B in their molecule were useful in imparting to various resins a radiation interceptive effect of the near infrared portion without causing an objectionable decline of transmission of the visible region (Japanese patent application publication No. 25,335/1968). However, these special compounds have the disadvantage in that their preparation is complicated.

As a result of our researches for a compound which would be inexpensive and easily available; which could be incorporated uniformly dispersed in the methyl methacrylate resin; which, in itself, possesses good stability and furthermore is not such that it possibly could cause a decline in the weatherability or heat resistance of the resin; and which, in addition, satisfactorily absorbs the thermic rays from the sun and other light sources and prevents their transmission but transmits the light rays of the visible region to an extent such that the see-through property of the resin does not suffer to an objectionable degree while absorbing the light rays of the visible region to an extent necessary for glare prevention; we found that when a very readily prepared and easily available nickel compound was incorporated in the methyl methacrylate resin in the amounts previously indicated the aforementioned requirements could be satisfied to advantage.

It is therefore an object of the present invention to provide an infrared or heat-absorbent methyl methacrylate resin and shaped articles made therefrom which satisfy the aforesaid requirements.

Other objects and advantages of the invention will become apparent from the following description.

The foregoing objects are achieved by a thermic ray-absorbent methyl methacrylate resin composition and shaped articles made therefrom, wherein said resin being a methyl methacrylate resin which may contain not over 50% by weight of a copolymerizable monomer is incorporated with a nickel compound selected from the group consisting of organic acid salts of nickel and nickel complexes, in an amount, calculated as nickel, of 0.07–5% by weight, preferably 0.1–2% by weight, and still more preferably 0.3–1.5% by weight.

As the aforesaid copolymerizable monomer, aside from the methyl ester of methacrylic alkyl esters, mention can be made of such, for example, as the methacrylic alkyl esters as ethyl methacrylate, propyl methacrylate, butyl methacrylate, 2-ethylhexyl methacrylate, and lauryl methacrylate, the methacrylic cycloalkyl esters as cyclopentyl methacrylate and cyclohexyl methacrylate; the methacrylic hydroxyalkyl esters as hydroxyethyl methacrylate and hydroxypropyl methacrylate; the acrylic alkyl esters as methyl acrylate, ethyl acrylate, propyl acrylate, butyl acrylate, 2-ethylhexyl acrylate and lauryl acrylate; the acrylic hydroxyalkyl esters as hydroxyethyl acrylate and hydroxypropyl acrylate; the acrylic cycloalkyl esters as cyclopentyl acrylate and cyclohexyl acrylate; and methacrylic acid, acrylic acid, styrene, vinyl acetate and acrylonitrile.

These copolymerizable monomers are copolymerized in an amount not exceeding that of the methyl methacrylate. Since the desirable properties of the methyl methacrylate resin, e.g., mechanical strength and thermal and optical properties, tend to decline correspondingly as the amount used becomes greater than this amount, the copolymerization of these monomers are carried out in the present invention using the above-indicated amount.

The copolymerization of these monomers is not limited to a single class but a plurality of classes may be used, in which case they are used in amounts such that the total amount satisfies the foregoing requirement.

The nickel compound to be incorporated in the methyl methacrylate resin in accordance with the present invention are selected from the group consisting of the organic acid salts of nickel and nickel complexes.

As such nickel compounds, included are, for example, the organic acid salts of nickel such as nickel acetate, nickel naphthenate, nickel stearate, nickel oleate and nickel benzoate; and the nickel complexes such as nickel-acetylacetonate and nickel-acetoacetate. Further, the organic acid salts of nickel such as nickel methacrylate, nickel acrylate and nickel alpha-chloroacrylate are also useable, but since their solubility in the resin is relatively low, they are not recommended. Again, while nickel naphthenate is useable, it also cannot be recommended since it gives off an offensive odor.

Of the compounds given hereinabove, those which can be recommended as being desirable are nickel acetate, nickel benzoate and nickel-acetoacetate. While nickel-acetylacetonate is likewise a densirable nickel compound from the standpoint of such as its solubility in the resin, metallic equivalence and stability, it compares unfavorably with the three nickel compounds recommended above with respect to its cost as well as its stability when left standing after monomers have been mixed.

The organic acid salts and organic complexes of cobalt and iron, which also belong as in the case with nickel to Group VIII period 4 of the Periodic System of Elements, when incorporated in the resin in a concentration of the order such as to demonstrate a practical thermic ray absorption effect causes an excessive decline in the transmission of visible light due to their relatively great absorption of the light rays of the visible region. Hence, in most cases the see-through property suffers. Moreover, the discoloration of the resin is also pronounced, with the consequence that it becomes difficult to match color with color tones other than that which is characteristic of the metal used. Hence, these compounds are without any practical value in the present invention.

According to the present invention, the nickel compounds, such as hereinbefore described, are incorporated in the resin (or the monomer or monomeric mixture which is to form the resin) uniformly therein by dispersing or dissolving the nickel compounds therein in an amount of 0.07–5% by weight, preferably 0.1–2% by weight, and still more preferably 0.3–1.5%, based on the resin. While it is not entirely clear as to whether the nickel compound is incorporated in the resin merely physically or is incorporated therein with a chemical bond, it is inferred in the case, for example, of the organic acid salts of such as the foregoing methacrylic and acrylic acids that they are incorporated with a chemical bond. According to the present invention, the end is achieved in either of the cases of physical or chemical incorporation. Hence, it is to be understood that the term "incorporate," as used herein, is meant to include both physical and/or chemical incorporation.

The nickel compound is incorporated in this invention in the amount range indicated above. If the amount incorporated is less than this range, a satisfactory thermic ray-absorbent effect is not demonstrated, whereas if the amount incorporated exceeds this range, discoloration and darkening (or turbidity), imparting adverse effects on the see-through property, of the resin tend to occur. Therefore, the above-indicated range should be employed.

While the incorporation of the nickel compound in the resin may be accomplished at any time prior to the completion of the polymerization reaction, for ensuring a uniform incorporation of the nickel compound, it is best to add it to the polymerization system either before or at the time of initiating the polymerization reaction. It usually is added to the starting monomer before the initiation of the polymerization reaction, but it also can be added to the monomeric syrup containing a polymer.

In the case where the nickel compound is soluble in the methyl methacrylate which may contain not over 50% by weight of a copolymerizable monomer and furthermore the polymer obtained by polymerizing and curing the so obtained nickel compound-dissolved polymerization system maintains its transparency, the nickel compound can be merely admixed with the polymerization system, but in those cases where either the solubility of the nickel compound in the methyl methacrylate which may contain not over 50% by weight of a copolymerizable monomer is small or the polymer obtained from the nickel compound-dissolved methyl methacrylate loses its transparency, the nickel compound is best dissolved uniformly in the methyl methacrylate which may contain not over 50% by weight of a copolymerizable monomer, using conjointly a suitable dissolving assistant, after which the so obtained nickel compound-dissolved polymerization system is polymerized and cured.

As the assistant used for this purpose, useable are the organic acids or other hydrophilic organic compounds which are soluble in the methyl methacrylate which may contain not over 50% by weight of a copolymerizable monomer, particularly preferred being the hydrophilic monomers which are copolymerizable with methyl methacrylate. These hydrophilic monomers include such, for example, as acrylic acid, methacrylic acid and hydroxyethyl methacrylate.

The amount in which these assistants are added is suitably chosen in accordance with the class of monomer or monomers making up the polymerization system. Usually, they are used in a range of 0.5–20% by weight, and preferably on the order of 1–10% by weight, based on the methyl methacrylate.

The invention resin composition can contain plasticizers, flame retardants and other additives. In addition, color matching can also be accomplished by the conjoint use of a suitable oil-soluble dyestuff.

As additives of this kind, mention can be made of plasticizers such, for example, as dibutyl phthalate, dihexyl phthalate and dioctyl phthalate; flame retardants such, for example, as tetrabromo bisphenol A, pentabromophenol, tetrabromophthalic anhydride and perchlorocyclopentadodecane; and oil-soluble dyestuffs such, for example, as Seikagen-O-Blue GK–1200 (Dainichiseika Company, Japan), Oil Red KB (Toyo Ink Mfg. Co., Japan) and Ceres Yellow 3G (Bayer).

On the other hand, since the method itself of polymerizing the methyl methacrylate which may contain not over 50% by weight of a copolymerizable monomer is without the scope of the present invention and is a well-known art, the details thereof will be omitted but, if described briefly, it is carried out in the following manner. For example, 0.001–0.2% by weight of a radical polymerization initiator such as azobisisobutyronitrile and lauryl peroxide is added and dissolved in the monomer. Then the monomer is cast in a form consisting of two sheets of tempered glass arranged at a prescribed interval, after which the cast is deaired under reduced pressure and thereafter held at a constant temperature ranging between 50° to 80° C. until completion of the cure. This is followed by holding the cast for a further one hour at 110-120° C. to complete the polymerization and cure followed by removal from the form.

The invention composition, in either the form of a monomeric solution or a polymer-containing monomeric syrup, can be made into shaped articles of suitable shape by casting into molds, dipping a substrate in the liquid or casting onto a die plate. Examples include shaped articles formed into such shapes as film, sheet, plate and laminate.

These shaped articles are useful for such purposes as window glass, doors and skylights of automobile, ship, aircraft and building, such purposes as protective filters for equipment using intense light sources such as projectors and television equipment, such purposes as protective goggles or shields to remove infrared rays, such purposes as forming thermophotographic sensitive layers as in the Thermofax method, as well as other similar uses.

Absorption spectrum of an invention shaped article obtained in the hereinafter given Example III and that of a similar shaped article of the usual methyl methacrylate not containing a nickel compound were determined. In both cases, the specimen was a sheet about 3 mm. in thickness. The results obtained are shown in the accompanying drawing.

In the drawing the wavelength (micron) of light is indicated along the horizontal axis, whereas the transmission (percent) is indicated along the vertical axis. Curve I is the absorption spectrum of the resin sheet obtained in Example III, while Curve II is that of the usual methyl methacrylate sheet.

It can be seen from this comparison that it is possible according to the present invention to provide shaped articles which while demonstrating superior thermic ray-absorbent ability permit the passage of visible light to such an extent that the see-through property is not adversely affected and at the same time achieve the glare prevention effect.

Next, the following examples are given for illustrating several modes of practicing the present invention.

In the examples the parts and percentage are on a weight basis. The rate of transmission of solar radiant energy in the examples is a value obtained by using the absorption spectrum converted to that for a specimen either 5.00 mm. or 3.00 mm. thick and the spectrum of solar radiant energy mentioned in the "Plexiglas Handbook for Aircraft Engineers" (1952) published by Rohm and Haas Company, the wavelengths being divided into 50 m$\mu$-widths. On the other hand, the rate of visible light transmission is a value obtained calculated in accordance with the method of JIS Z 8722 (A light) using the foregoing absorption spectrum. The solar radiant energy transmissions calculated by the foregoing method for the poly (methyl methacrylate) sheets whose thicknesses were 5.00 mm. and 3.00 mm. were 89.0% and 90.5%, respectively, and the visible light transmissions were respectively 93.0% and 93.3%.

The weatherability was indicated in color difference, $\Delta E$(NBS unit), which was determined after a 600-hour test using a sunshine weatherometer (ASTM D307 44 and ASTM D1305 60T). On the other hand, the heat resistance was likewise indicated by means of $\Delta E$, which was obtained after conducting the test in a 150° C. air oven for 20 minutes.

The weatherability values for test pieces of poly(methyl methacrylate) sheets of 3.00 mm. and 5.00 mm. thickness were respectively 0.6 and 0.7 while their heat resistance values were in both cases 0.0.

EXAMPLE 1

Ten parts of a 25% methacrylic acid solution of nickel acetate tetrahydrate, 0.04 part of azobisisobutyronitrile (AIBN) as the polymerization catalyst, and 0.5 part of stearic acid as the mold release were mixed and dissolved in 90 parts of methyl methacrylate, followed by casting in a form made up of two sheets of tempered glass spaced 5 mm. apart where the cast was deaired under reduced pressure. The cast was then maintained at 60° C. for 5 hours to effect its polymerization and cure, and thereafter held for a further one hour at 110° C. to complete the cure. As a result, a light yellow-green, transparent sheetform cast product was obtained.

The solar radiant energy transmission of this cast product was 62.6% and its visible light transmission was 83.2%.

Further, its weatherability and heat resistance were 0.8 and 3.8, respectively.

EXAMPLE 2

Fifteen parts of a 20% acrylic acid solution of nickel benzoate, 0.04 part of azobisisobutyronitrile and 0.5 part of stearic acid were mixed and dissolved in 85 parts of methyl methacrylate and thereafter polymerized and cured as in Example 1 to obtain a light yellow-green, transparent sheetform cast product.

The solar radiant energy transmission of this cast product was 64.8% and its visible light transmission was 82.5%.

EXAMPLE 3

7.5 parts of a 25% methacrylic acid solution of nickel acetate tetrahydrate, 0.085 part of cobalt acrylate as a color matching agent, 0.00267 part of a dyestuff Seikagen-O-Blue GK–1200, 0.00255 part of a dyestuff Oil Red KB, 0.07 part of azobisisobutyronitrile and 0.5 part of stearic acid were mixed and dissolved in 92.5 parts of methyl methacrylate, then cast in a form of tempered glass whose two sheets of glass were spaced 3 mm. apart. Thereafter, the polymerization reaction and cure were carried out as in Example 1 to obtain a light gray, transparent cast product of sheet form.

The solar radiant energy transmission of this cast product was 61.5% and its visible transmission was 52.7%.

Further, its weatherability and heat resistance were 1.2 and 3.1, respectively.

EXAMPLE 4

Two parts of acetyl acetone nickel, 1 part of acrylic acid, 0.04 part of azobisisobutyronitrile and 0.5 part of stearic acid were mixed and dissolved in 97 parts of a methyl methacrylate syrup (viscosity 2.0 poises, polymer content 7 wt. percent), following which the polymerization reaction and cure was carried out as in Example 1 to obtain a light yellow-green, transparent sheetform cast product.

The solar radiant energy transmission of this cast product was 66.9% and its visible light transmission was 82.2%.

EXAMPLE 5

Twenty parts of a 8.5% acrylic acid solution of nickel-acetoacetate, 0.1 part of azobisisobutyronitrile and 0.5 part of stearic acid were mixed and dissolved in 80 parts of methyl methacrylate, after which the polymerization reaction and cure were carried out as in Example 1 to obtain a light green, transparent sheetform cast product.

The solar radiant energy transmission of this cast product was 68.7% and its visible transmission was 84.0%.

We claim:

1. A substantially transparent and glare resistant thermic ray-absorbent methyl methacrylate resin composition comprising a methyl methacrylate resin selected from homopolymers of methyl methacrylate and copolymers of methyl methacrylate with up to 50% by weight of a monomer selected from the group consisting of alkyl esters of not less than 2 carbon atoms of methacrylic acid, methacrylic hydroxy-alkyl esters, methacrylic cycloalkyl esters, acrylic alkyl esters, acrylic hydroxyalkyl esters, acrylic cycloalkyl esters, acrylic acid, methacrylic acid, styrene, vinyl acetate and acrylonitrile, said resin having incorporated therein a nickel compound selected from the group consisting of organic acid salts of nickel wherein the organic acid is selected from stearic acid, oleic acid, benzoic acid and naphthoic acid, and nickel complexes selected from nickel-acetylacetonate and nickel acetoacetate in an amount of 0.07–5% by weight, calculated as nickel.

2. A composition according to claim 1 wherein said nickel compound is selected from the group consisting of nickel benzoate and nickel-acetoacetate.

3. A composition according to claim 1 wherein said nickel compound is nickel-acetylacetonate.

4. A composition according to claim 1 wherein said nickel compound is selected from the group consisting of nickel naphthenate, nickel stearate and nickel oleate.

5. A composition according to claim 1 wherein said copolymerizable monomer is selected from the group consisting of alkyl esters of not less than 2 carbon atoms of methacrylic acid, methacrylic hydroxyalkyl esters, methacrylic cycloalkyl esters, acrylic alkyl esters, acrylic hydroxyalkyl esters and acrylic cycloalkyl esters.

6. A composition according to claim 5 wherein said copolymerizable monomer is selected from the group consisting of ethyl methacrylate, propyl methacrylate, butyl methacrylate, 2-ethyl-hexyl methacrylate, lauryl methacrylate; cyclopentyl methacrylate, cyclohexyl methacrylate; hydroxyethyl methacrylate, hydroxypropyl methacrylate; methyl acrylate, ethyl acrylate, propyl acrylate, butyl acrylate, 2-ethyl-hexyl acrylate, lauryl acrylate; hydroxyethyl acrylate, hydroxypropyl acrylate and cyclopentyl acrylate cyclohexyl acrylate.

7. A composition according to claim 1 wherein said copolymerizable monomer is selected from the group consisting of acrylic acid and methacrylic acid.

8. A composition according to claim 1 wherein said copolymerizable monomer is selected from the group consisting of styrene, vinyl acetate and acrylonitrile.

9. A composition according to claim 1 wherein said nickel compound is incorporated in an amount 0.1–2% by weight, calculated as nickel.

10. Substantially transparent and glare resistant shaped articles of a thermic ray-absorbent methyl methacrylate resin, said resin comprising a methyl methacrylate resin selected from homopolymers of methyl methacrylate and copolymers of methyl methacrylate with up to 50% by weight of a monomer selected from the group consisting of alkyl esters of not less than 2 carbon atoms of methacrylic acid, methacrylic hydroxy-alkyl esters, methacrylic cycloalkyl esters, acrylic alkyl esters, acrylic hydroxyalkyl esters, acrylic cycloalkyl esters, acrylic acid, methacrylic acid, styrene, vinyl aetate and acrylonitrile, said resin having incorporated therein a nickel compound selected from the group consisting of organic acid salts of nickel wherein the organic acid is selected from stearic acid, oleic acid, benzoic acid and naphthoic acid, and nickel complexes selected from nickel-acetylacetonate and nickel-acetoacetate, in an amount of 0.07–5% by weight, calculated as nickel.

11. A substantially transparent and glare resistant thermic ray-absorbent methyl methacrylate resin composition comprising a methyl methacrylate resin selected from homopolymers of methyl methacrylate and copolymers of methyl methacrylate with up to 50% by weight of a copolymerizable monomer selected from the group consisting of alkyl esters of not less than 2 carbon atoms of methacrylic acid, methacrylic hydroxyalkyl esters, acrylic hydroxyalkyl esters and acrylic cycloalkyl esters, said resin having incorporated therein a nickel compound selected from the group consisting of organic acid salts of nickel wherein the organic acid is selected from hydrocarbyl aliphatic monocarboxylic acids of up to 18 carbon atoms, benzoic acid and naphthoic acid, and nickel complexes selected from nickel-acetylacetonate and nickel-acetoacetate in an amount of 0.07–5% by weight, calculated as nickel.

12. A composition of claim 11 wherein said copolymerizable monomer is selected from the group consisting of ethyl methacrylate, propyl methacrylate, butyl methacrylate, 2-ethylhexyl methacrylate, lauryl methacrylate; cyclopentyl methacrylate, cyclohexyl methacrylate; hydroxyethyl methacrylate, hydroxypropyl methacrylate; methyl acrylate, ethyl acrylate, propyl acrylate, butyl acrylate, 2-ethyl-hexyl acrylate, lauryl acrylate; hydroxyethyl acrylate, hydroxypropyl acrylate; cyclopentyl acrylate and cyclohexyl acrylate.

13. The composition of claim 11 wherein said nickel compound is nickel acetate.

14. Substantially transparent and glare resistant shaped articles of a thermic ray-absorbent methyl methacrylate resin, comprising a methyl methacrylate resin selected from homopolymers of methyl methacrylate and copolymers of methyl methacrylate with up to 50% by weight of a copolymerizable monomer selected from the group consisting of alkyl esters of not less than 2 carbon atoms of methacrylic acid, methacrylic hydroxyalkyl esters, methacrylic cycloalkyl esters, acrylic alkyl esters, acrylic hydroxyalkyl esters and acrylic cycloalkyl esters, said resin having incorporated therein a nickel compound selected from the group consisting of organic acid salts of nickel wherein the organic acid is selected from hydrocarbyl aliphatic monocarboxylic acids of up to 18 carbon atoms, benzoic acid and naphthoic acid, and nickel complexes selected from nickel-acetylacetonate and nickel-acetoacetate in an amount of 0.07–5% by weight, calculated as nickel.

15. The articles of claim 14 wherein said copolymerizable monomer is selected from the group consisting of ethyl methacrylate, propyl methacrylate, butyl methacrylate, 2-ethylhexyl methacrylate, lauryl methacrylate; cyclopentyl methacrylate, cyclohexyl methacrylate; hydroxyethyl methacrylate, hydroxypropyl methacrylate; methyl acrylate, ethyl acrylate, propyl acrylate, butyl acrylate, 2-ethyl-hexyl acrylate, lauryl acrylate, hydroxyethyl acrylate, hydroxypropyl acrylate; cyclopentyl acrylate and cyclohexyl acrylate.

16. The shaped articles of claim 14 wherein said nickel compound is nickel acetate.

17. A substantially transparent and glare resistant thermic ray-absorbent methyl methacrylate resin composition comprising a methyl methacrylate resin selected from homopolymers of methyl methacrylate and copolymers of methyl methacrylate with up to 50% by weight of a copolymerizable monomer selected from the group consisting of styrene, vinyl acetate and acrylonitrile, said resin having incorporated therein a nickel compound selected from the group consisting of organic acid salts of nickel wherein the organic acid is selected from hydrocarbyl aliphatic monocarboxylic acids of up to 18 carbon atoms, benzoic acid and naphthoic acid, and nickel complexes selected from nickel-acetylacetonate and nickel-acetoacetate in an amount of 0.07–5% by weight, calculated as nickel.

18. The composition of claim 17 wherein said nickel compound is nickel acetate.

19. Substantially transparent and glare resistant shaped articles of a thermic ray-absorbent methyl methacrylate resin, comprising a methyl methacrylate resin selected from homopolymers of methyl methacrylate and copolymers of methyl methacrylate with up to 50% by weight of a copolymerizable monomer selected from the group consisting of styrene, vinyl acetate and acrylontirile, said resin having incorporated therein a nickel compound selected from the group consisting of organic acid salts of nickel wherein the organic acid is selected from hydrocarbyl aliphatic monocarboxylic acids of up to 18 carbon atoms, benzoic acid and naphthoic acid, and nickel complexes selected from nickel-acetylacetonate and nickel-acetoacetate in an amount of 0.07–5% by weight, calculated as nickel.

20. The shaped articles of claim 19 wherein said nickel compound is nickel acetate.

References Cited

UNITED STATES PATENTS

| | | | |
|---|---|---|---|
| 2,172,249 | 9/1939 | Lowry | 252—300 |
| 3,214,399 | 10/1965 | Saccomandi | 260—45.75 |
| 3,325,444 | 6/1967 | Best et al. | 260—45.75 |
| 3,341,464 | 9/1967 | Susi et al. | 252—300 |
| 3,464,943 | 9/1969 | Newland et al. | 260—45.75 |
| 2,754,280 | 8/1956 | Brown et al. | 260—29.6 |

DONALD E. CZAJA, Primary Examiner

V. P. HOKE, Assistant Examiner

U.S. Cl. X.R.

252—300; 260—45.75 N, 86.1 R, 86.1 N, 86.1 E, 86.7, 89.5 A